(No Model.)
W. BOYRER.
BAIL LOCK.
No. 445,493.  Patented Jan. 27, 1891.
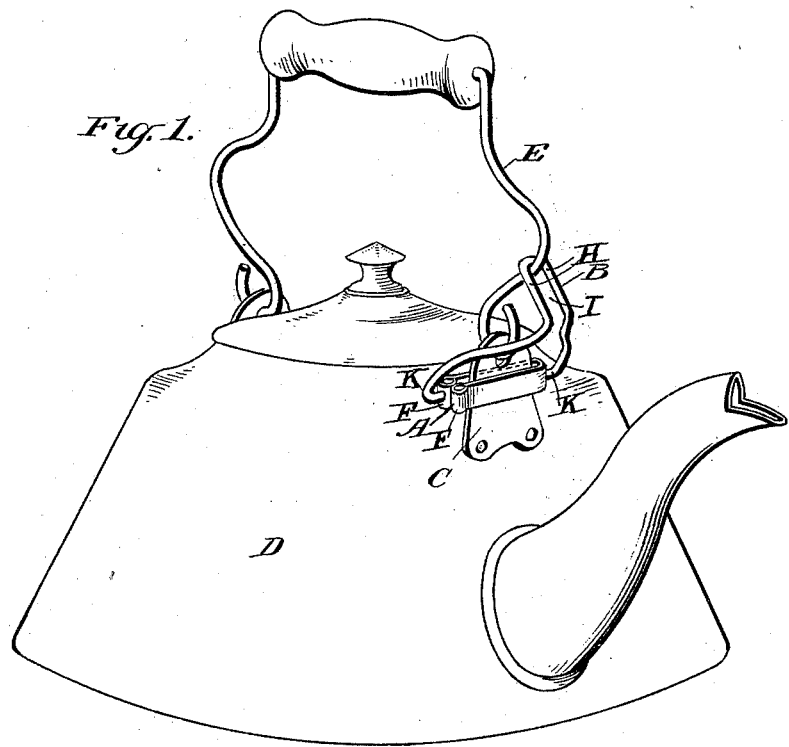
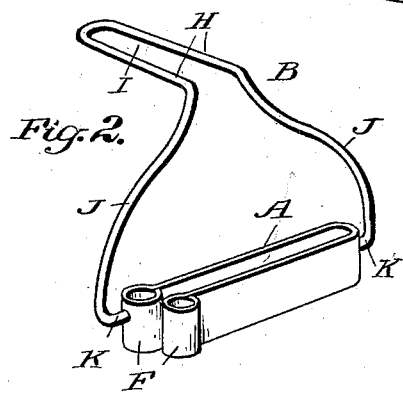
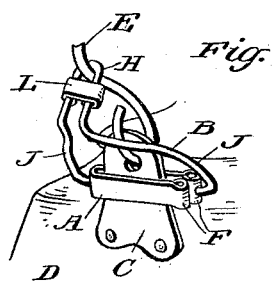
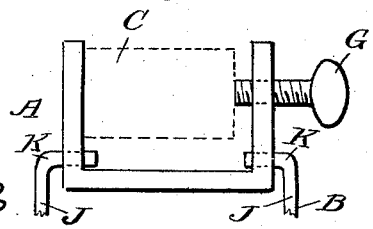
WITNESSES:
INVENTOR:
W. Boyrer
BY Munn & Co.
ATTORNEYS

UNITED STATES PATENT OFFICE.

WILLIAM BOYRER, OF NEW YORK, N. Y.

BAIL-LOCK.

SPECIFICATION forming part of Letters Patent No. 445,493, dated January 27, 1891.

Application filed November 14, 1890. Serial No. 371,459. (No model.)

*To all whom it may concern:*

Be it known that I, WILLIAM BOYRER, of New York city, in the county and State of New York, have invented a new and Improved Bail-Lock, of which the following is a full, clear, and exact description.

The object of the invention is to provide a new and improved lock or support especially designed for use on pots, pans, kettles, &c., to conveniently hold the bail or handle off of the hot body part or from the steam issuing from under the lid of the pot, kettle, &c., so as to prevent the heating of the bail or handle and at the same time permit the convenient filling of the pot, kettle, &c., on which the device is applied.

The invention consists of a clamp adapted to clamp on one of the ears of the pot or kettle and a swinging arm pivoted on the said clamp and adapted to engage the bail or handle.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a perspective view of the improvement as applied. Fig. 2 is a perspective view of the device. Fig. 3 is a perspective view of a modified form of the improvement, and Fig. 4 is a plan view of a modified form of clamp for use on very large kettles.

The improved bail-lock is provided with a clamp A and an arm B, pivoted on the said clamp A. The latter is adapted to be clamped onto one of the ears C of the pot, kettle, pan, &c., on which the device is to be applied, while the arm B is adapted to engage the bail or handle E on said pot, pan, kettle, &c. The clamp A is made in such a form that it can be easily attached to or detached from the ear of the pot or kettle, so that the device can be put on or taken off at any time.

As shown in Figs. 1, 2, and 3, the clamp A is made of a single piece of metal doubled up into U shape, and provided at its ends with two eyes F, arranged so as to touch each other to prevent displacement of the clamp from the ear C. As shown in Fig. 4, the clamp A is made U-shaped, one of its ends being provided with a screw G, adapted to screw against the ear C, so as to securely fasten the clamp to the said ear.

The arm B is preferably made of a single piece of wire bent in its middle to form the two parallel arms H, between which in the slot I is passed the bail or handle, as is plainly shown in Fig. 1. The ends of the parallel arms H continue in the downwardly and outwardly curved arms J, each of which is provided with an inwardly-extending trunnion K, of which one is adapted to engage the middle part of the U-shaped clamp A, as is plainly shown in Fig. 2, and the other trunnion passes into one of the eyes F, directly opposite the other trunnion K. As shown in Fig. 4, the two trunnions pass at opposite places into the ends of the clamp A. The arm B thus swings by its trunnions K on the clamp A.

In order to lock the bail E in the end of the slot I of the arm B, a sleeve L is provided, pivoted on one of the parallel arms H and adapted to hook onto the opposite arm H after the bail or handle is in place in the end of the slot I.

The device is used as follows: The arm B is turned downward and rearward, and the clamp A is then slipped onto one of the ears C, so that the device is attached, the arm B resting on the top or lid of the kettle or pot. By now holding the bail or handle E in a vertical position, or nearly so, and moving the swinging arm B upward, the slot I engages the bail E until the latter finally rests in the end of the slot at the junction of the two parallel arms H. The arm B now hangs somewhat forward, as is plainly illustrated in Fig. 1, and locks the bail E in a vertical position, or nearly so. When the pot, kettle, pan, &c., is subjected to heat or steam issues from under the lid, then the said bail or handle is not heated, as it is entirely out of the way of the steam and raised over the hot body of the pan, pot, or kettle. If it is desired to throw the handle E downward, the operator swings the arm B inward until the bail or handle E is out of the slot I, so that the bail or handle can swing downward into a lowermost position without being hindered by the arm B.

The device is easily detached from the kettle or pot whenever desired by first removing the clamp A when the arm B is in an inner lowermost position, as above described. The device can then be put away for future use.

Having thus described my invention, I claim as new and desire to secure by Letters Patent—

1. A bail-lock comprising a clamp adapted to clamp one of the ears of the pot or kettle and a swinging arm pivoted on the said clamp and adapted to engage the bail or handle, substantially as shown and described.

2. A bail-lock comprising a clamp formed of a single piece of metal bent in U shape to engage one of the ears of the pot or kettle and an arm made of a single piece of wire doubled up in its middle to form parallel arms terminating in curved arms provided with trunnions journaled in the said clamp, substantially as shown and described.

3. A bail-lock comprising a clamp formed of a single piece of metal bent in U shape to engage one of the ears of the pot or kettle, an arm made of a single piece of wire doubled up in its middle to form parallel arms terminating in curved arms provided with trunnions journaled in the said clamp, and a sleeve fitted to slide on the said parallel arms to lock the bail or handle in place between the two parallel arms, substantially as shown and described.

WILLIAM BOYRER.

Witnesses:
THEO. G. HOSTER,
EDGAR TATE.